United States Patent [19]
Matheny et al.

[11] Patent Number: 6,115,729
[45] Date of Patent: Sep. 5, 2000

[54] FLOATING POINT MULTIPLY-ACCUMULATE UNIT

[75] Inventors: David Terrence Matheny; David Vivian Jaggar, both of Austin, Tex.

[73] Assignee: Arm Limited, Cherry Hinton, United Kingdom

[21] Appl. No.: 09/136,843

[22] Filed: Aug. 20, 1998

[51] Int. Cl.[7] .................................................. G06F 7/38
[52] U.S. Cl. .......................................................... 708/501
[58] Field of Search .................................... 708/501, 523

[56] References Cited

U.S. PATENT DOCUMENTS

| | | | |
|---|---|---|---|
| 5,517,438 | 5/1996 | Dao-Trong et al. | 708/501 |
| 5,751,621 | 5/1998 | Arakawa | 708/501 |
| 5,757,686 | 5/1998 | Nuffziger et al. | 708/501 |
| 5,790,444 | 8/1998 | Olson et al. | 708/501 |
| 5,993,051 | 11/1999 | Jiang et al. | 708/501 |
| 5,999,960 | 12/1999 | Gerwig et al. | 708/501 |

FOREIGN PATENT DOCUMENTS 0 547 835   6/1993   European Pat. Off. .

*Primary Examiner*—David H. Malzahn
*Attorney, Agent, or Firm*—Nixon & Vanderhye P.C.

[57] ABSTRACT

A floating point unit 10 provides a multiply-accumulate operation to determine a result B+(A*C). The multiplier 20 takes several processing cycles to determine the product (A*C). Whilst the multiplier 20 and its subsequent carry-save-adder 26 operate, an aligned value B' of the addend B is generated by an alignment-shifter 34. The aligned-addend B' may only partially overlap with the product (A*C) to which it is to be added using an adder 44. Any high-order-portion HOP of the aligned-addend B' that does not overlap with the product (A*C) must be subsequently concatenated with the output of the adder 44 that sums the product (A*C) with the overlapping portion of the aligned-addend B'. If the sum performed by the adder 44 generates a carry then it is an incremented version IHOP of the high-order-portion that should be concatenated with the output of the adder 44. This incremented-high-order-portion is generated by the adder 44 during otherwise idle processing cycles present due to the multiplier 20 operating over multiple cycles.

12 Claims, 4 Drawing Sheets

FLOATING POINT MULTIPLY-ACCUMULATE UNIT

BACKGROUND OF THE INVENTION

1. Field of the Invention

This invention relates to the field of data processing. More particularly, this invention relates to data processing systems incorporating a floating point unit.

2. Description of the Prior Art

It is known to provide data processing systems including a floating point unit. Within such floating point units it is known to provide multiply-accumulate operations of the form B+(A*C). These multiply-accumulate operations are strongly advantageous when performing digital signal processing operations, such as FIR filter functions. Whilst the ability to perform a multiply-accumulate as a single operation reduces code size and increases speed, a disadvantage is that the size of the circuits required within the floating point unit increases. Increasing the size of the required circuits is disadvantageous as it makes the system more expensive and consume more power.

Within floating point units providing multiply-accumulate operations, the addend B is aligned with the product (A*C) before the accumulate is performed by an adder. It is desirable from a circuit size point of view that the adder should be no wider than needed to sum the overlapping portions of the aligned-addend B' and the product (A*C). If there are high order bits within the two inputs to be added that extend above the width of the adder, then the carry output of the adder can be used determine whether or not these high order bits should be incremented. An incrementer responsive to such a carry output may then be provided in order to perform the possible increment of the high order bits. This incrementer is a large circuit element.

It is also known within floating point units to reduce the size of the multiplier by techniques such as "double-pumping", whereby the output is calculated over two processing cycles to obtain a full-width result with the output after the first cycle being recirculated through the multiplier.

SUMMARY OF THE INVENTION

It is an object of the present invention to provide a data processing system incorporating a floating point unit that provides a multiply-accumulate operation with a reduced circuit size.

Viewed from one aspect the present invention provides apparatus for performing a floating point multiply-accumulate operation B+(A*C) in which an addend B is added to the product of a multiplicand A and a multiplier C, said apparatus comprising:

a multiplier responsive to said multiplicand A and said multiplier C for generating a product result (A*C) by multiplying said multiplicand A by said multiplier C;

an addend-alignment-calculator for calculating an alignment-shift value required between said addend B and said product result (A*C);

an alignment-shifter responsive to said alignment-shift value for floating-point-significance-aligning said addend B with said product result (A*C) to generate an aligned-addend B'; and an adder responsive to said aligned-addend B' from said alignment-shifter and said product result (A*C) from said multiplier for generating a multiply-accumulate result B+(A*C) by adding said product result (A*C) to said aligned-addend B'; wherein said multiplier performs said multiplication over a plurality of processing cycles;

said alignment-shifter generates at least any high-order-portion of said aligned-addend B' of greater significance than said product result (A*C) at least one processing cycle before generation of said product result (A*C) is completed;

said adder increments said high-order-portion generated by said alignment-shifter to generate an incremented-high-order-portion before generation of said product result (A*C) is completed; and a high-order-portion-multiplexer selectively concatenates either said high-order-portion or said incremented-high-order-portion with said product result (A*C) in dependence upon a carry-out result for said product result (A*C).

The present invention recognizes that in a system in which the multiplier takes more than one processing cycle to produce the product (A*C), the adder that will sum the product (A*C) with the aligned-addend B' is standing idle for at least one processing cycle. The present invention exploits this unused resource by providing that it performs the task of incrementing the high-order-portion of the sum such that an incremented-high-order-portion is available to be concatenated with the output of the adder produced from the overlapping parts of the product (A*C) and the aligned-addend B' should this be appropriate.

Using the adder in this way in a time period during which it would otherwise be unused is strongly advantageous in reducing the circuit size that in turn reduces the cost of the system and the power consumption.

The adder may have a bit-width greater than the bit-width of the product (A*C). However, in a system in which an important aim is to reduce circuit size it is preferred that the adder has a bit-width matching that of the product (A*C). When such a narrow adder is used a high-order-portion falling outside the width of the adder is more likely to be present so making the invention more useful.

In order to increase the processing performance of the floating point unit it is desirable that it should be arranged as a multistage system so that processing operations may be pipelined within it. Within such multistage systems in accordance with preferred embodiments of the invention the adder stage will be downstream of the multiplier stage.

A multistage system will also advantageously provide a normalization and rounding stage following the adder stage.

In order to accommodate the generation of the incremented-high-order-portion and the high-order-portion in advance of their being required it is preferred to provide embodiments in which these are latched within respective latches before being selected by the high-order-portion-multiplexer.

High performance multipliers may use a carry-save number format to represent the partially formed product (A*C). In such systems a carry-save adder stage is provided between the multiplier and the adder that performs the accumulate such that the carry-save product can be changed to a direct representation of the product (A*C) ready for the accumulate operation. The adder that performs the accumulate can be employed during the time when the carry-save-adder is operating to calculate the incremented-high-order-portion.

The alignment-shifter could be "double-pumped" in the same manner as discussed above in relation to the multiplier, but preferably the alignment-shifter has a bit-width sufficient to calculate the aligned-addend B' in a single processing cycle. In practice the extra size needed for the alignment-shifter to achieve this is compensated for by reduced multiplexing requirements for its output and the overall control of the elements within the floating point unit is simplified.

Whilst the invention could be implemented as discrete components, it is strongly advantageous that the circuits take the form of a floating point unit within a microprocessor.

Whilst a wide alignment-shifter is used to produce the aligned-addend B' in a single cycle, the circuit latching requirements can be reduced by latching the high-order-portion during a first processing cycle and then latching the remaining portion during a second processing cycle. The addend B is available from the start of the multiply-accumulate operation and so there is plenty of time to perform the alignment-shift and latch the result over two cycles before the aligned-addend B', the high-order-portion and the incremented-high-order-portion are required by the adder.

Viewed from another aspect the present invention provides a method of performing a floating point multiply-accumulate operation B+(A*C) in which an addend B is added to the product of a multiplicand A and a multiplier C, said method comprising the steps of:

in response to said multiplicand A and said multiplier C, generating a product result (A*C) by multiplying said multiplicand A by said multiplier C;

calculating an alignment-shift value required between said addend B and said product value (A*C);

in response to said alignment-shift value, floating-point-significance-aligning said addend B with said product result (A*C) to generate an aligned-addend B';

in response to said aligned-addend B' and said product result (A*C), generating a multiply-accumulate result B+(A*C) by adding with an adder said product result (A*C) to said aligned-addend B'; wherein said multiplication is performed over a plurality of processing cycles; and said alignment-shifting generates at least any high-order-portion of said aligned-addend B' of greater significance than said product result (A*C) at least one processing cycle before generation of said product result (A*C) is completed; and further comprising the steps of:

incrementing said high-order-portion using said adder to generate an incremented-high-order-portion before generation of said product result (A*C) is completed; and selectively concatenating either said high-order-portion or said incremented-high-order-portion with said product result (A*C) in dependence upon a carry-out result for said product result (A*C).

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 1:
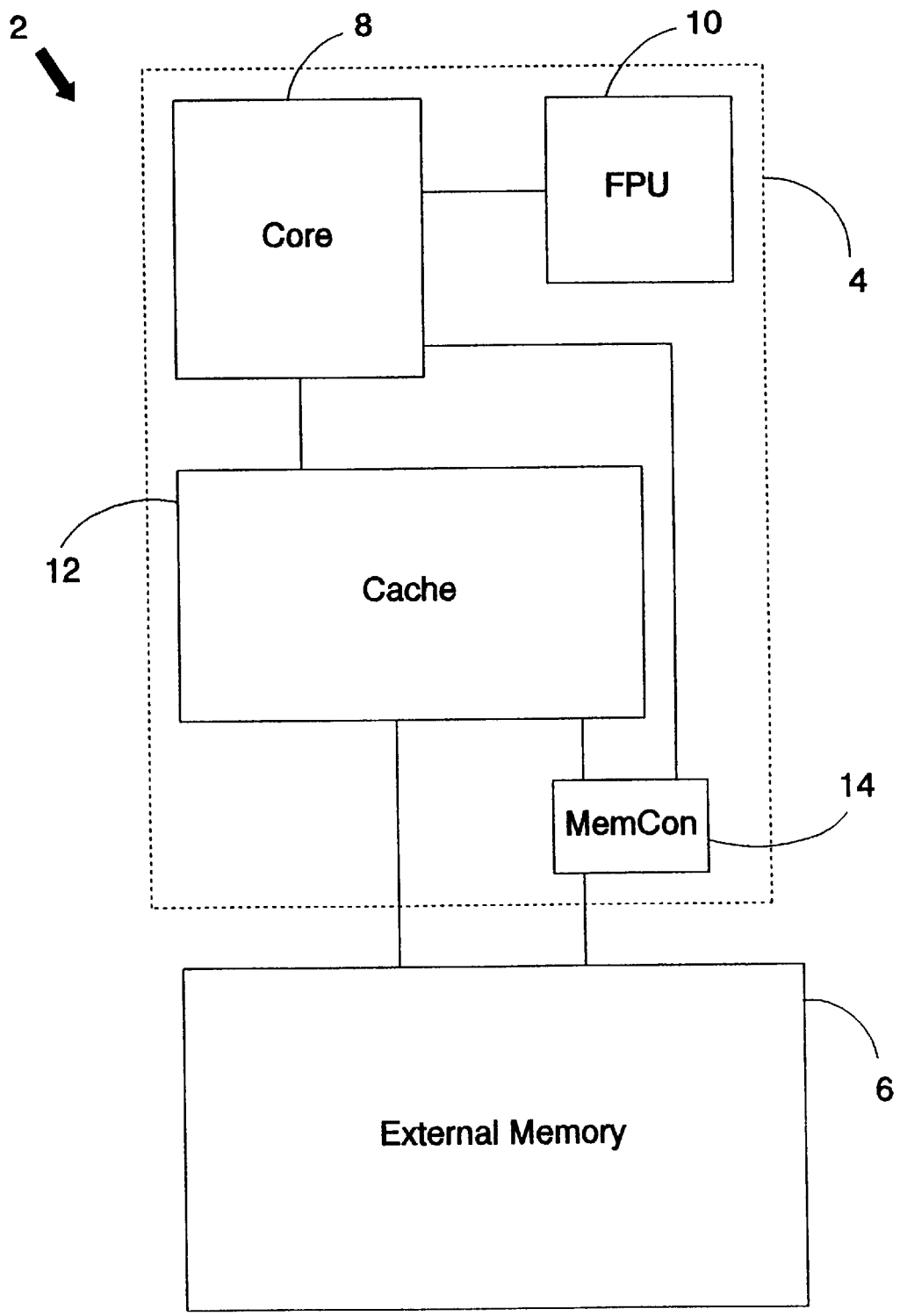
FIG. 1 illustrates a data processing system incorporating a microprocessor with a floating point unit.

FIG. 1 schematically illustrates a data processing system 2 comprising a microprocessor 4 and an external memory 6. The microprocessor 4 includes a core 8, a floating point unit coprocessor 10, a cache 12 and a memory controller 14.

In operation the floating point unit coprocessor 10 provides, among other operations, multiply-accumulate operations in response dedicated multiply-accumulate instructions. The reading and writing of operands and results to and from the floating point unit coprocessor 10 is controlled by the core 8. The core 8 reads and writes data from and to the memory (both the cache 12 and the external memory 6) in cooperation with the memory controller 14.

Figure 2A:
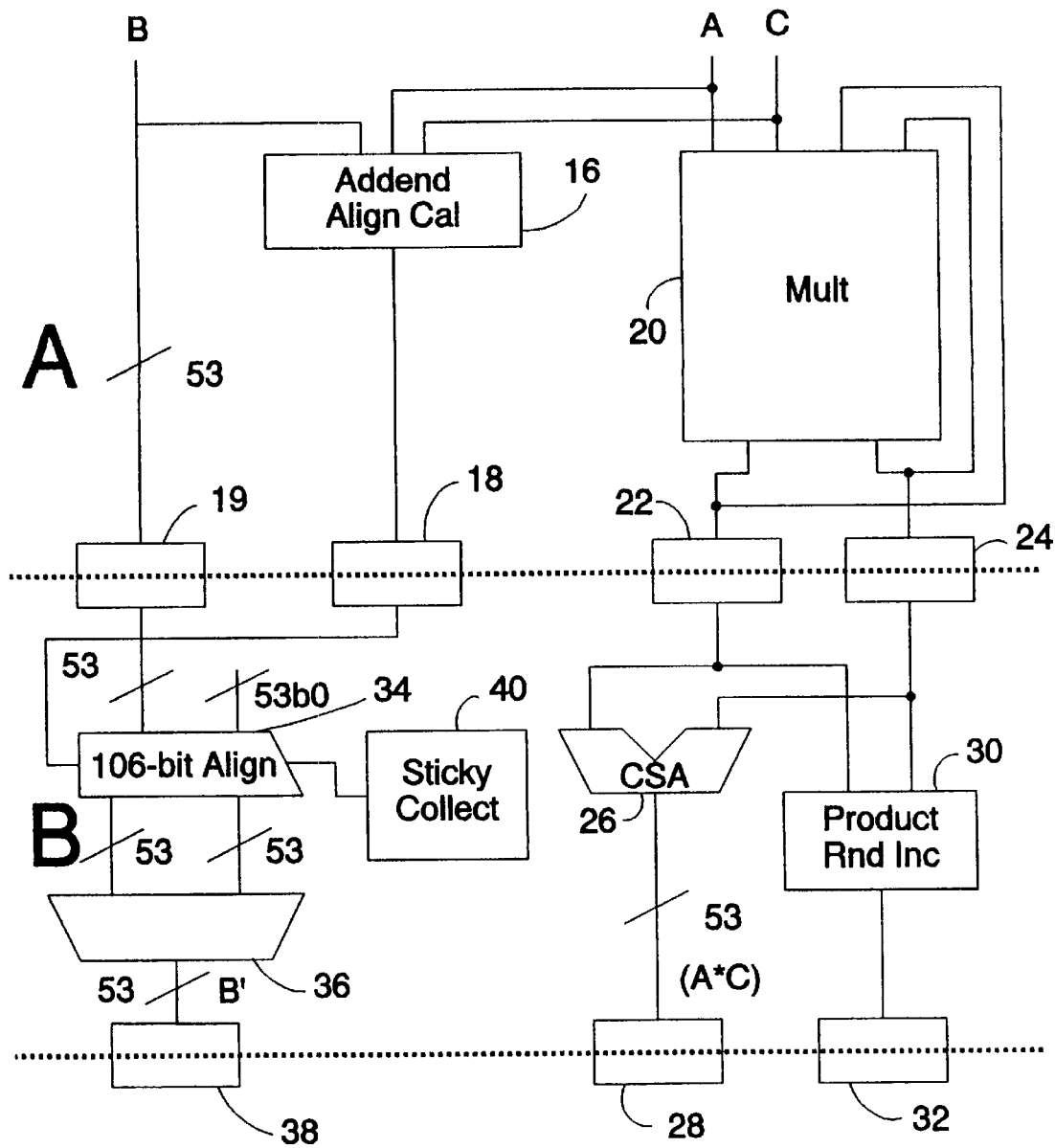
FIGS. 2A and 2B together schematically illustrate the multiply-accumulate portion of a floating point unit.
Figure 2B:
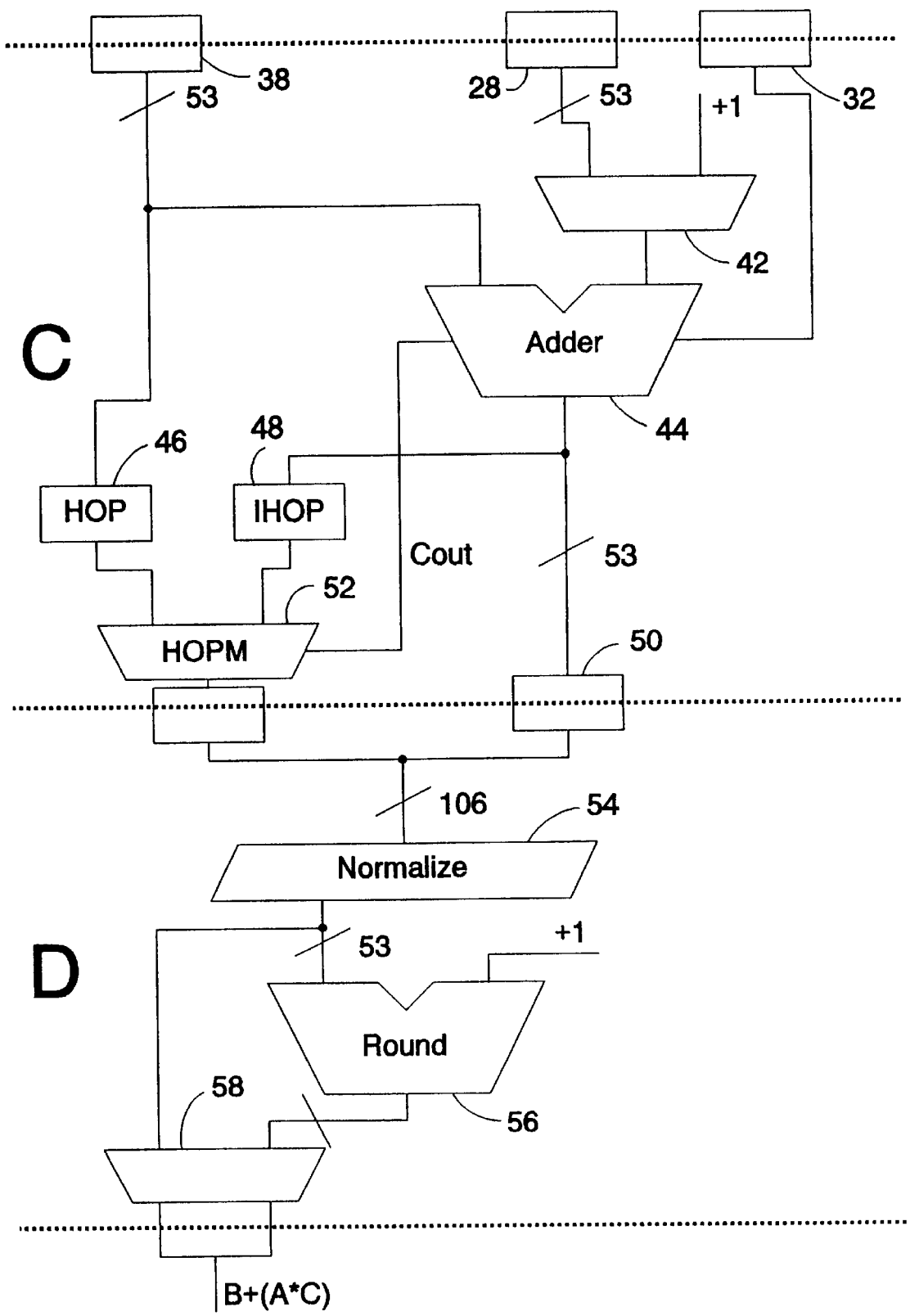

FIGS. 2A and 2B together schematically illustrate a portion of the datapath through the floating point unit coprocessor 10. More particularly, FIGS. 2A and 2B show the portion of the datapath and performs a multiply-accumulate operation B+(A*C). The input operands B, A and C are input at the top of FIG. 2A. An addend-alignment-calculator is responsive to the exponent portions of the input operands to determine the amount of shifting (alignment-shift value) required to floating-point-align the mantissa portions of the addend B and the product (A*C). This shift amount is latched within an alignment latch 18.

The operands A and C are also input to a multiplier circuit 20 that calculates a carry-save representation of the product (A*C) over two processing cycles and then stores this carry-save representation within carry-save latches 22, 24. The partially formed product result after one processing cycle is recirculated through the multiplier 20 during a second processing cycle to produce the final carry-save representation. The multiple processing cycles required by the multiplier 20 to generate the product (A*C) yields the time that enables a downstream adder to additionally perform the task of incrementing the high-order-portion. The addend value B is latched within an addend latch 19. The multiplier 20 and the addend-alignment-calculator 16 are disposed within a multiplier stage A.

A carry-save-adder stage B contains a carry-save-adder 26 that receives the carry-save representation of the product (A*C) from the carry-save latches 22, 24 and sums these to output the product (A*C) that is latched within a product latch 28. A product rounding increment determination circuit 30 is also responsive to the carry-save representation to determine whether any rounding increment is required to the output of the carry-save-adder 26. This rounding determination is latched within a rounding latch 32.

A 106-bit alignment-shifter 34 serves to floating-point-align the addend B with the product (A*C) before they are summed. The addend B starts in its leftmost position in which it abuts but does not overlap with the product (A*C) and is then right-shifted by an amount stored within the alignment latch 18. In this example the mantissa datapath width is 53 bits and so the addend B is trailing zero extended with 53 zeros to provide bit values for all the possible bit positions in which the addend B may overlap with the product (A*C). During a first processing cycle the 53 most significant bits of the aligned-addend B' are selected by an alignment multiplexer 36 and latched as the high-order-portion HOP within a buffering latch 38. During a second processing cycle the 53 least significant bits of the aligned-addend B' are latched within the buffering latch 38. These 53 least significant bits are the bits that overlap with the product (A*C). A sticky-bit collection circuit 40 serves to determine the sticky-bits representing any bits of the aligned-addend B' of less significance than the least significant bit of the product (A*C).

The multiplier 20 takes two processing cycles to generate the carry-save representation of the product and the carry-save adder 26 takes a further processing cycle to generate the product (A*C). Whilst the product (A*C) is being calculated over these three processing cycles, the alignment-shifter value is first calculated in one cycle and then the two parts of the aligned-addend B' are latched within the following two cycles. The high-order-portion is read from the alignment-shifter 34 in the first of these cycles and latched within the buffering latch 38. During the second of these cycles, the overlapping portion of the aligned-addend B' is read from the alignment-shifter 34 and stored within the buffering latch 38 whilst the high-order-portion is passed on from the buffering latch 38 to be latched and used elsewhere within a following adder stage C.

The adder stage C operates during a first processing cycle to calculate an incremented-high-order-portion IHOP using the adder 44 and the value stored within the buffering latch 38. An adder-input-multiplexer 42 serves to select a value of +1 as the other input to the adder 44. Respective high-order-registers 46, 48 serve to store the high-order-portion directly received from the buffering latch 38 and the incremented-high-order-portion output from the adder 44. During a second processing cycle the adder-input-multiplexer 42 selects the product (A*C) from the product latch 28 as one input to the adder 44 with the other input being the overlapping portion of the aligned-addend B' from the buffering latch 38 that is stored there during this processing cycle.

The uncorrected (unrounded and unnormalized) result output from the adder 44 is latched within an uncorrected result latch 50. At the same time the carry out signal Cout from the adder is used by a high-order-portion-multiplexer 52 to select which of the high-order-portion or incremented-high-order-portion should be concatenated with the uncorrected result.

It will be seen that the adder 44 is used to provide both the incremented-high-order-portion and the sum of the overlapping portions during respective processing cycles. This reuse of the adder 44 avoids the need to provide a special-purpose incrementer to calculate the incremented-high-order-portion so reducing the circuit size.

The final rounding and normalization stage D concatenates the two 53 bit mantissa portions and uses a 106 bit normalizer 54 to shift them to match the exponent value of the multiply-accumulate result B+(A*C). A rounding-adder 56 calculates an incremented value of the output from the normalizer 54. A selection between the output the rounding-adder 56 and the direct output of the normalizer 54 is made by an output multiplexer 58 that is controlled by rounding information determined at upstream portions of the datapath in a standard manner.

Figure 3:
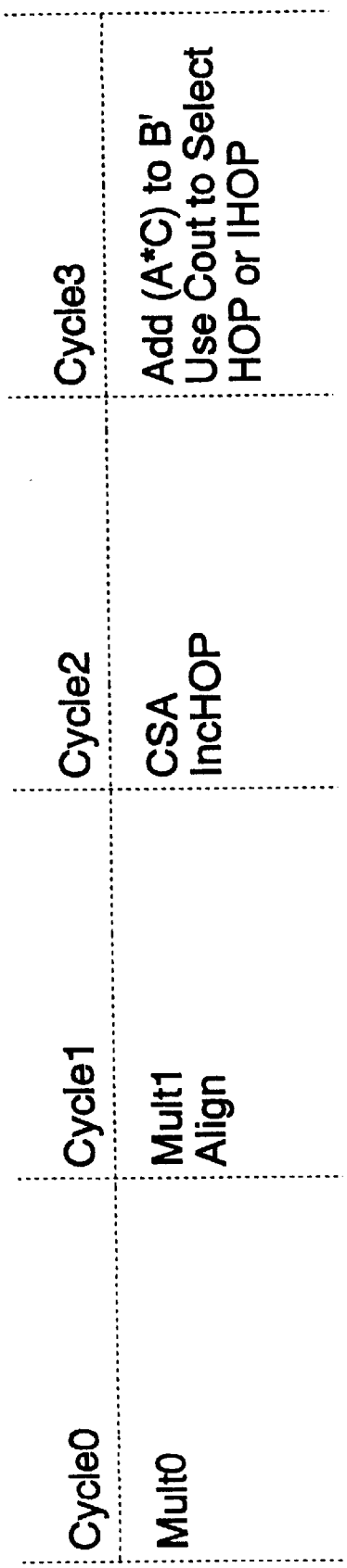
FIG. 3 illustrates the processing tasks performed within the processing cycles needed to produce the result of a multiply-accumulate operation.

FIG. 3 illustrates the operations performed during the first 4 processing cycles taken to perform a multiply-accumulate operation in accordance with the above described system. During cycles 0 and 1 the multiplier 20 performs generation of the carry-save representation of the product. During cycle 1 the alignment-shifter 34 performs the floating-point-alignment of the addend B. During cycle 2 the carry-save-adder 26 generates the product (A*C) whilst the adder 44 operates to calculate the incremented-high-order-portion. During cycle 3 the adder 44 sums the overlapping portion of the aligned-addend B' with the product (A*C) and the carry out result Cout from the adder 44 is used to select which of the incremented-high-order-portion IHOP and the high-order-portion HOP should be concatenated with the output from the adder 44. During a further cycle (not shown) the normalization and rounding of stage D take place to generate the final multiply-accumulate result B+(A*C).

Figure 4:
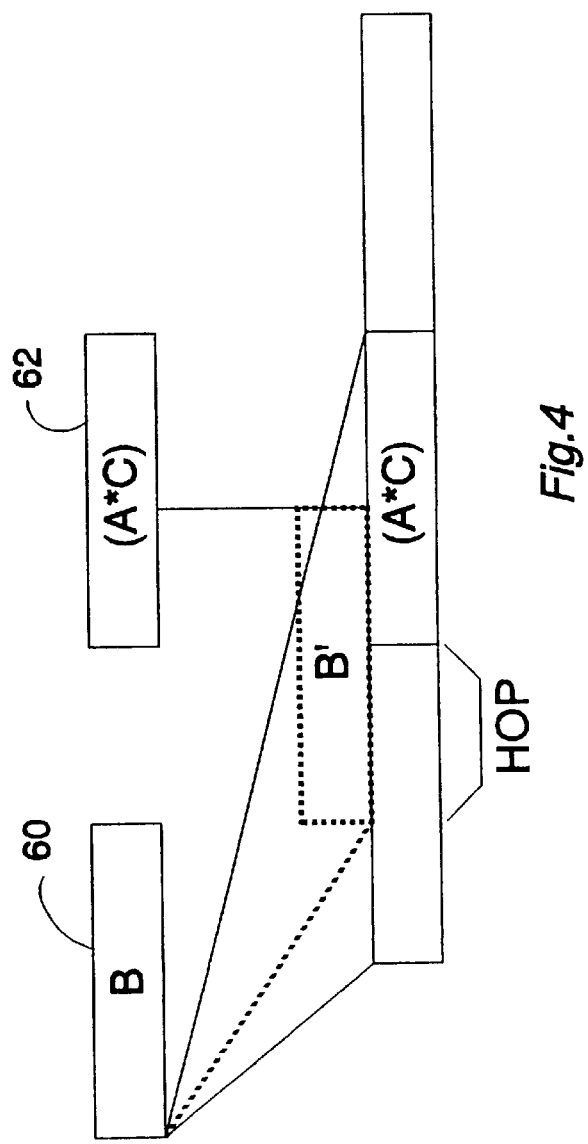
FIG. 4 illustrates the alignment-shifting between an addend B and a product (A*C).

FIG. 4 illustrates how the addend 60 is aligned with the product (A*C) 62. The alignment-shifter 34 starts with the addend 60 being in its most significant position. The addend B can then be shifted to the right by up to 106 places. The extreme possible positions are illustrated by the solid lines. The dotted lines indicate an intermediate case in which the addend B is shifted so that it partially overlaps with the product (A*C). Any lefthand part of the aligned-addend B' that does not overlap is the high-order-portion HOP. Any righthand non-overlapping bits are handled by the sticky-bit collection circuit 40.

Although particular embodiments of the invention have been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. Apparatus for performing a floating point multiply-accumulate operation B+(A*C) in which an addend B is added to the product of a multiplicand A and a multiplier C, said apparatus comprising:

a multiplier responsive to said multiplicand A and said multiplier C for generating a product result (A*C) by multiplying said multiplicand A by said multiplier C;

an addend-alignment-calculator for calculating an alignment-shift value required between said addend B and said product result (A*C);

an alignment-shifter responsive to said alignment-shift value for floating-point-significance-aligning said addend B with said product result (A*C) to generate an aligned-addend B'; and an adder responsive to said aligned-addend B' from said alignment-shifter and said product result (A*C) from said multiplier for generating a multiply-accumulate result B+(A*C) by adding said product result (A*C) to said aligned-addend B'; wherein said multiplier performs said multiplication over a plurality of processing cycles;

said alignment-shifter generates at least any high-order-portion of said aligned-addend B' of greater significance than said product result (A*C) at least one processing cycle before generation of said product result (A*C) is completed;

said adder increments said high-order-portion generated by said alignment-shifter to generate an incremented-high-order-portion before generation of said product result (A*C) is completed; and a high-order-portion-multiplexer selectively concatenates either said high-order-portion or said incremented-high-order-portion with said product result (A*C) in dependence upon a carry-out result for said product result (A*C).

2. Apparatus as claimed in claim 1, wherein said adder has a bit-width matching a bit-width of said product result (A*C).

3. Apparatus as claimed in claim 1, wherein said product result (A*C) when concatenated with a high-order-portion has a bit-width greater than said bit-width of said adder.

4. Apparatus as claimed in claim 1, wherein said apparatus is a multistage circuit with said multiplier being in a multiplier stage and said adder being in an adder stage with said adder stage being downstream of said multiplier stage.

5. Apparatus as claimed in claim 4, wherein a normalization and rounding stage follow said adder stage.

6. Apparatus as claimed in claim 4, wherein said multiplier calculates said product result (A*C) in a carry-save format and a carry-save-add stage is disposed between said multiplier stage and said adder stage.

7. Apparatus as claimed in claim 6, wherein said alignment-shifter is disposed within said carry-save-add stage.

8. Apparatus as claimed in claim 1, wherein said high-order-portion and said incremented high-order-portion are stored in respective high-order-latches before being supplied to said high-order-portion-multiplexer.

9. Apparatus as claimed in claim 1, wherein said alignment-shifter has a bit-width at least equal to the sum of the bit-widths of said addend B and said product result (A*C).

10. Apparatus as claimed in claim 1, wherein said apparatus is a microprocessor including a floating point unit.

11. Apparatus as claimed in claim 1, wherein said high-order-portion output from said alignment-shifter is latched in a first processing cycle and a remaining portion of said aligned-addend B' output from said alignment-shifter is latched in a second processing cycle.

12. A method of performing a floating point multiply-accumulate operation B+(A*C) in which an addend B is added to the product of a multiplicand A and a multiplier C, said method comprising the steps of:

in response to said multiplicand A and said multiplier C, generating a product result (A*C) by multiplying said multiplicand A by said multiplier C;

calculating an alignment-shift value required between said addend B and said product value (A*C);

in response to said alignment-shift value, floating-point-significance-aligning said addend B with said product result (A*C) to generate an aligned-addend B';

in response to said aligned-addend B' and said product result (A*C), generating a multiply-accumulate result B+(A*C) by adding with an adder said product result (A*C) to said aligned-addend B'; wherein said multiplication is performed over a plurality of processing cycles; and said alignment-shifting generates at least any high-order-portion of said aligned-addend B' of greater significance than said product result (A*C) at least one processing cycle before generation of said product result (A*C) is completed; and further comprising the steps of:

incrementing said high-order-portion using said adder to generate an incremented-high-order-portion before generation of said product result (A*C) is completed; and selectively concatenating either said high-order-portion or said incremented-high-order-portion with said product result (A*C) in dependence upon a carry-out result for said product result (A*C).

* * * * *